(12) United States Patent
Fujioka

(10) Patent No.: US 7,211,025 B2
(45) Date of Patent: May 1, 2007

(54) VEHICULAR DRIVE SYSTEM

(75) Inventor: Masato Fujioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 10/936,719

(22) Filed: Sep. 9, 2004

(65) Prior Publication Data

US 2005/0139401 A1 Jun. 30, 2005

(30) Foreign Application Priority Data

Sep. 11, 2003 (JP) ............................ 2003-319296
Dec. 8, 2003 (JP) ............................ 2003-409311

(51) Int. Cl.
*H02P 15/00* (2006.01)
*F16H 57/02* (2006.01)
*F16H 57/04* (2006.01)
*F16H 61/00* (2006.01)
*H02K 47/00* (2006.01)

(52) U.S. Cl. .................... 477/8; 74/606 R; 310/113

(58) Field of Classification Search ............... 477/5, 477/6, 8; 310/113; 290/40 C, 38 R, 40 R, 290/46; 74/606 R
See application file for complete search history.

(56) References Cited

U.S. PATENT DOCUMENTS 6,116,364 A * 9/2000 Taguchi et al. ............ 180/65.2
6,323,613 B1 * 11/2001 Hara et al. .................. 318/471
6,365,983 B1 * 4/2002 Masberg et al. .......... 290/40 C
2004/0209786 A1* 10/2004 Sagawa et al. ............. 508/371

FOREIGN PATENT DOCUMENTS

EP 785612 A1 * 7/1997
JP 9-226394 9/1997

* cited by examiner

*Primary Examiner*—Tisha Lewis
(74) *Attorney, Agent, or Firm*—Westerman, Hattori, Daniels & Adrian LLP.

(57) ABSTRACT

In a vehicular drive system for a hybrid vehicle, in which driving forces of an engine and a motor are transmitted through a power transmission mechanism to driven wheels, a common oil stored in a transmission case and a motor case is used for lubricating the power transmission mechanism and the motor. During travel by using an engine, when a synchromesh mechanism operated by a shift fork isolates the motor from the power transmission mechanism, an oil return hole blocking rod, provided in the shift fork, blocks an oil return hole providing communication between the motor case and the transmission case, thereby preventing oil in the motor case from flowing into the transmission case, to lower oil level in the transmission case. Thus, during travel of the hybrid vehicle, driving force loss due to motor drag resistance and oil stirring resistance is minimized.

16 Claims, 15 Drawing Sheets

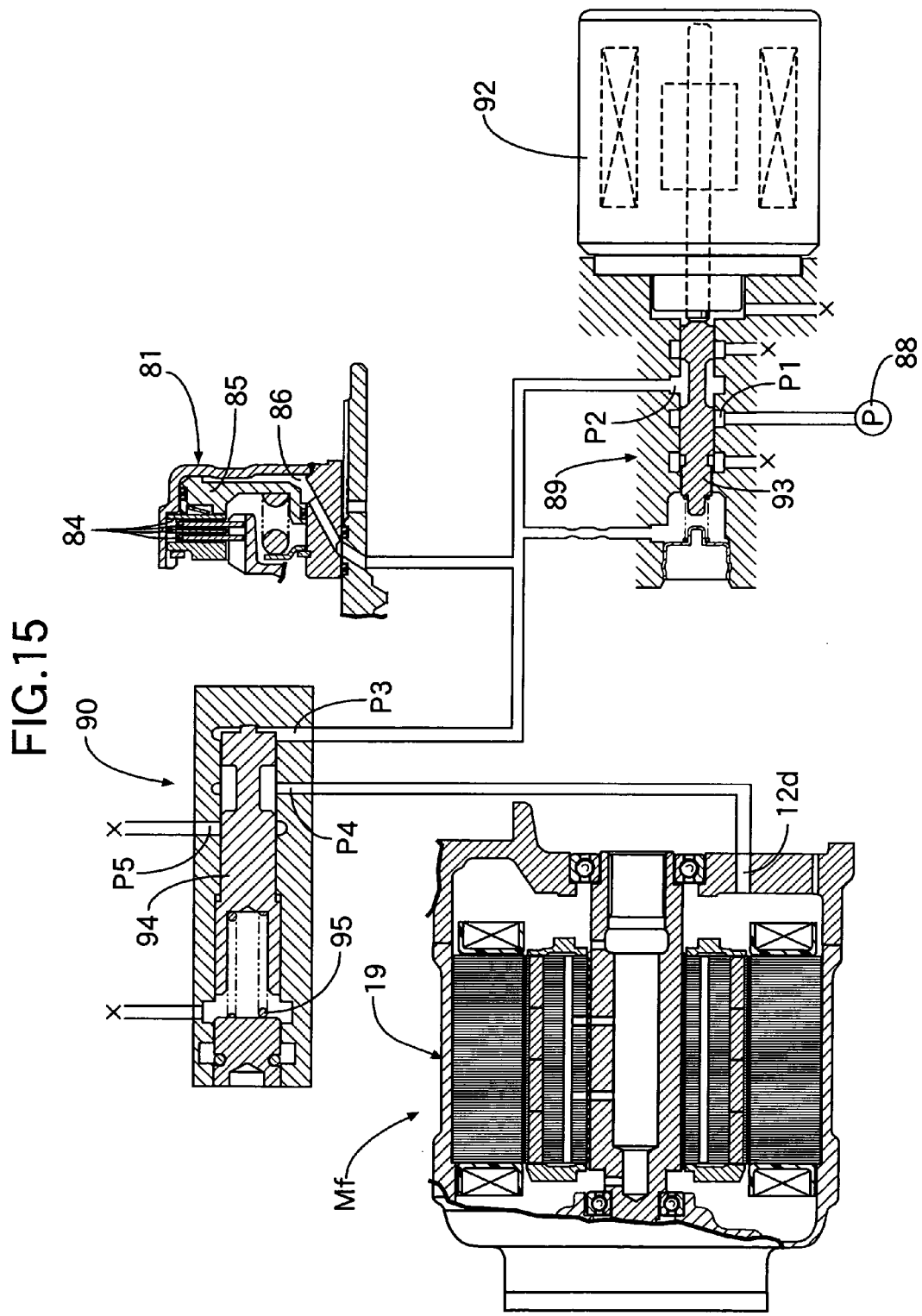

VEHICULAR DRIVE SYSTEM

BACKGROUND OF THE INVENTION

1. Field of the Invention

The present invention relates to a vehicular drive system in which a motor and a power transmission mechanism are connected via motor isolation means, and the driving force of the motor is transmitted to driven wheels via the power transmission mechanism, the power transmission mechanism and the motor being lubricated with a common oil.

2. Description of the Related Art

In a drive system for an electric motor vehicle described in Japanese Patent Application Laid-open No. 9-226394, a motor chamber housing a motor and a gear chamber housing a gear section for transmitting the driving force of the motor to driven wheels are separated by a partition wall, which has an orifice providing communication between the gear chamber and the motor chamber. When the motor is running, oil splashed by a rotating gear within the gear chamber is supplied to the motor chamber, thus lowering the oil level in the gear chamber to reduce the oil stirring resistance to the gear.

In a hybrid vehicle equipped with an engine and a motor as drive sources for travel, if the motor is connected to a transmission when the vehicle travels at high speed using the driving force of the engine, there is the problem that the motor is dragged by the driving force of the engine, thus generating a frictional loss. Furthermore, since the oil retained within the transmission is stirred by a rotating gear when the vehicle is traveling, there is the problem that the stirring resistance causes an engine driving force loss which is particularly large when the engine is running at high speed.

SUMMARY OF THE INVENTION

The present invention has been achieved under the above-mentioned circumstances, and it is an object thereof to minimize the loss in driving force due to motor drag resistance and oil stirring resistance during travel of a vehicle having at least a motor as a drive source for travel.

In order to attain this object, in accordance with a first aspect of the present invention, there is proposed a vehicular drive system that includes a motor, a power transmission mechanism, and motor isolation means via which the motor and the power transmission mechanism are connected. The driving force of the motor is transmitted to driven wheels via the power transmission mechanism. The power transmission mechanism and the motor are lubricated with a common oil. Furthermore, the vehicular drive system includes oil retaining means for retaining within a motor case a portion of the oil within a casing of the power transmission mechanism, when the motor isolation means isolates the motor from the power transmission mechanism.

In accordance with this arrangement, since the motor isolation means isolates the motor from the power transmission mechanism when the driving force of the motor is not needed, it is possible to eliminate the motor drag resistance, and moreover there is no possibility that the motor will excessively rotate even if the vehicle travels at high speed. Furthermore, accompanying the isolation of the motor, the oil retaining means retains within the motor case a portion of the oil within the casing of the power transmission mechanism, and thus it is possible to lower the oil level within the casing of the power transmission mechanism, thus reducing the oil stirring resistance. Since the motor is stopped at this time, even if the oil level within the motor case increases, the oil stirring resistance to a rotor of the motor will not increase.

Furthermore, in accordance with a second aspect of the present invention, in addition to the first aspect, the motor isolation means is a dog clutch, and the oil retaining means operates in mechanical association with engagement and disengagement of the dog clutch.

Therefore, by isolating the motor from the power transmission mechanism, it is possible to automatically lower the oil level within the casing of the power transmission mechanism.

Moreover, in accordance with a third aspect of the present invention, in addition to the first aspect, the motor isolation means is a hydraulic clutch, and the oil retaining means is operated by hydraulic pressure for engaging and disengaging the hydraulic clutch. Therefore, by isolating the motor from the power transmission mechanism, it is possible to automatically lower the oil level within the casing of the power transmission mechanism.

Furthermore, in accordance with a fourth aspect of the present invention, in addition to any one of the first to the third aspects, the vehicular drive system further includes an engine for driving the driven wheels via the power transmission mechanism, and the power transmission mechanism includes a transmission for varying the driving forces of the motor and the engine.

In accordance with this arrangement, since the driving forces of the engine and the motor are transmitted to the driven wheels via the transmission, when the vehicle travels by the driving force of the engine or by inertia, the oil stirring resistance within the casing of the transmission can be reduced.

Moreover, in accordance with a fifth aspect of the present invention, in addition to any one of the first to the third aspects, the power transmission mechanism includes a differential gear for distributing the driving force of the motor between the left and right driven wheels.

In accordance with this arrangement, since the driving force of the motor is distributed between the left and right driven wheels via the differential gear, when the vehicle is made to travel by a drive source other than the motor or inertia, the oil stirring resistance within the casing of the differential gear can be reduced.

A transmission case 13 and a rear gear case 101 of the embodiments correspond to the casing of the present invention, and fifth and sixth synchromesh mechanisms 56 and 128 of the embodiments correspond to the motor isolation means or the dog clutch of the present invention. An hydraulic clutch 81 of the embodiments corresponds to the motor isolation means of the present invention, and oil return hole blocking rods 74 and 133 and an oil discharge valve 90 of the embodiments correspond to the oil retaining means of the present invention. A front motor Mf and a rear motor Mr of the embodiments correspond to the motor of the present invention, and a manual transmission T of the embodiments corresponds to the power transmission mechanism or the transmission of the present invention. A front differential gear Df of the embodiments corresponds to the power transmission mechanism of the present invention, and a rear differential gear Dr of the embodiments corresponds to the power transmission mechanism or the differential gear of the present invention. A reduction gear R of the embodiments corresponds to the power transmission mechanism of the present invention, and front wheels Wf and rear wheels Wr of the embodiments correspond to the driven wheels of the present invention.

The above-mentioned object, other objects, characteristics, and advantages of the present invention will become apparent from preferred embodiments that will be described in detail below by reference to the attached drawings.

BRIEF DESCRIPTION OF THE DRAWINGS

FIG. 1 is a diagram showing the overall arrangement of a hybrid vehicle;

FIG. 2 is a longitudinal sectional view (a sectional view along line 2—2 in FIG. 6) of a front motor, a manual transmission, and a front differential gear;

FIG. 3 is an enlarged view of Part A of FIG. 2;

FIG. 4 is an enlarged view of Part B of FIG. 2;

FIG. 5 is an enlarged view of Part C of FIG. 2;

FIG. 6 is a sectional view along line 6—6 in FIG. 2;

FIG. 7 is a sectional view along line 7—7 in FIG. 3;

FIG. 8 is a diagram, corresponding to FIG. 7, for explaining the operation;

FIG. 9 is a skeleton diagram of a drive system for front wheels;

FIG. 10 is a longitudinal sectional view (a sectional view along line 10—10 in FIG. 12) of a rear motor, a reduction gear, and a rear differential gear;

FIG. 11 is a diagram, corresponding to FIG. 10, for explaining the operation;

FIG. 12 is a sectional view along line 12—12 in FIG. 10;

FIG. 13 is a skeleton diagram of a drive system for rear wheels;

FIG. 15 is a diagram showing the structure of a hydraulic control system of the second embodiment.

DESCRIPTION OF THE PREFERRED EMBODIMENTS

Figure 1:
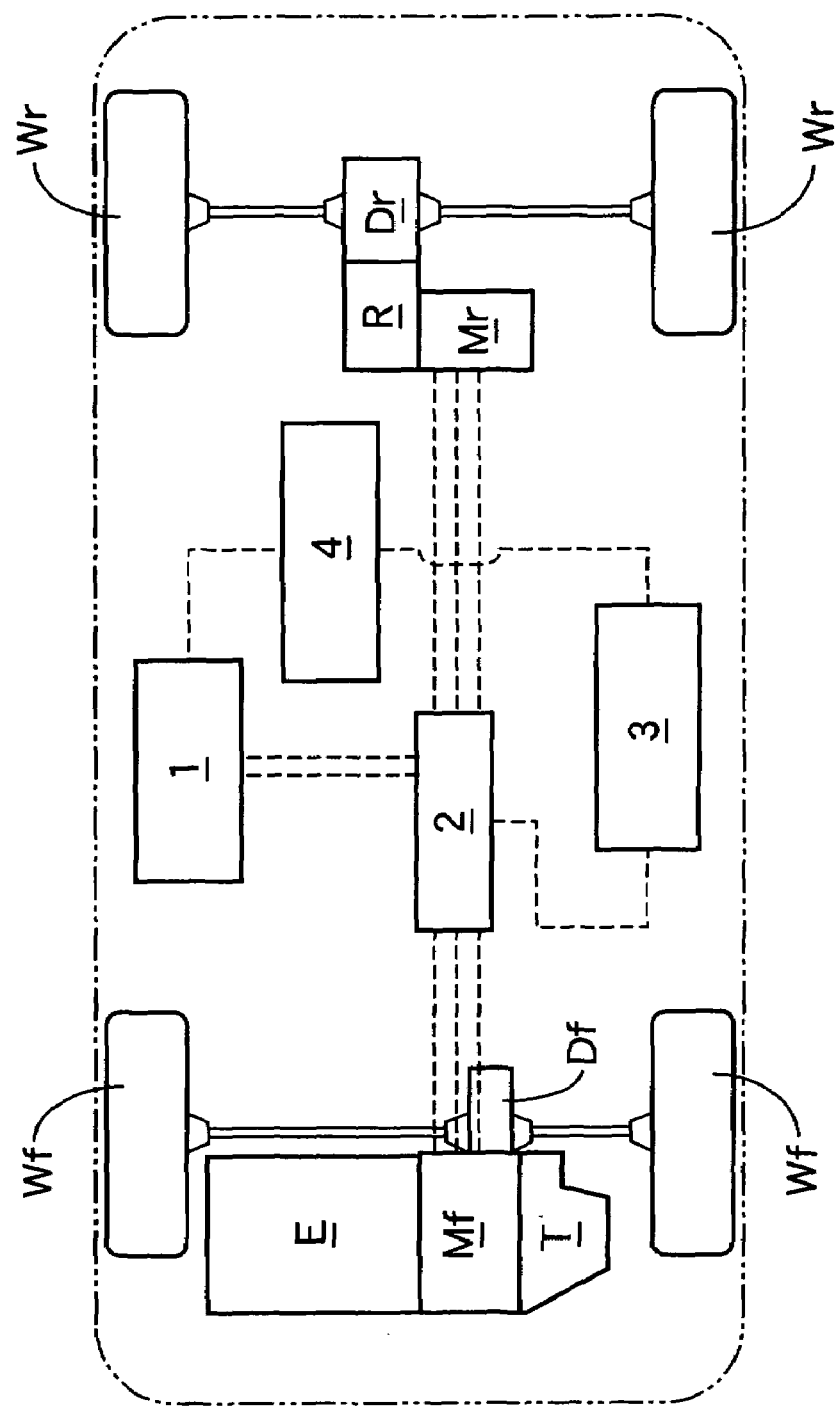
FIG. 1 to FIG. 13 illustrate a first embodiment of the present invention.

Referring to FIG. 1, a hybrid vehicle having left and right front wheels Wf which are main driven wheels, and left and right rear wheels Wr which are secondary driven wheels, is equipped with an engine E, a front motor Mf, a manual transmission T, and a front differential gear Df which are connected to the front wheels Wf. The vehicle also has a rear motor Mr, a reduction gear R, and a rear differential gear Dr which are connected to the rear wheels Wr. The front motor Mf and the rear motor Mr are driven by electric power from a battery 1 via a power drive unit 2. A remaining capacity detection device 4 for detecting the remaining capacity of the battery 1 is connected to a managing ECU 3 for controlling the power drive unit 2.

When the vehicle travels normally, the front wheels Wf, which are the main driven wheels, are driven by the engine E, and as necessary the driving force of the engine E may be assisted by the driving force of the front motor Mf, or the vehicle may travel with only the driving force of the front motor Mf. When the vehicle travels in the four wheel drive mode, in addition to the front wheels Wf, which are the main driven wheels, the rear wheels Wr which are the secondary driven wheels, are driven by the rear motor Mr. In this process, the front motor Mf is driven by the engine E and functions as a generator, and the thus-generated electric power is supplied directly to the rear motor Mr, or supplied to the rear motor Mr after being first charged to the battery 1. When the vehicle decelerates, the front motor Mf and the rear motor Mr brake regeneratively and function as generators, and the thus-generated electric power charges the battery 1.

Referring to FIG. 2 to FIG. 9, the manual transmission T of the hybrid vehicle includes a transmission case 13 having a right-hand first casing 11 and a left-hand second casing 12 joined on a mating face extending in the longitudinal direction of the vehicle body, and the engine E is joined to an opening 11a on the right-hand face of the first casing 11. Supported on the first and second casings 11 and 12 are a main shaft MS, a counter shaft CS, and a reverse counter shaft RCS, the main shaft MS being supported via ball bearings 14 and 15, the counter shaft CS being supported via a roller bearing 16 and a ball bearing 17, and the reverse counter shaft RCS being shorter than the main shaft MS and the counter shaft CS. The right-hand end of the main shaft MS is connected to a crankshaft 18 of the engine E via a clutch C.

The front motor Mf includes a motor case 19 formed from a main body casing 19a, a front cover 12a joined to a front face of the casing 19a, and a rear cover 20 joined to a rear face of the casing 19a, the front cover 12a being formed integrally with the second casing 12. The front cover 12a is therefore not part of the transmission case 13 but forms a part of the motor case 19. A motor output shaft MOS is supported on the first and second casings 11 and 12 via ball bearings 21 and 22, and a rotor 23, fixed to the motor shaft 70, faces a stator 24 fixed to the inner periphery of the motor case 19.

A main first-speed gear 25, a main second-speed gear 26, and main reverse gear 27 are fixedly provided on the main shaft MS. Further, a main third-speed gear 28, a main fourth-speed gear 29, a main fifth-speed gear 30, and a main sixth-speed gear 31 are relatively rotatably supported on the main shaft MS via needle bearings 32 to 35. A counter first-speed gear 36 and a counter second-speed gear 37 are relatively rotatably supported on the counter shaft CS via needle bearings 38 and 39. Further, a counter third-speed gear 40, a counter fourth-speed gear 41, a counter fifth-speed gear 42, a counter sixth-speed gear 43, a counter reverse gear 44, and a final drive gear 45 are fixedly provided on the counter shaft CS.

The main first-speed gear 25, the main second-speed gear 26, the main third-speed gear 28, the main fourth-speed gear 29, the main fifth-speed gear 30, and the main sixth-speed gear 31 mesh with the counter first-speed gear 36, the counter second-speed gear 37, the counter third-speed gear 40, the counter fourth-speed gear 41, the counter fifth-speed gear 42, and the counter sixth-speed gear 43, respectively. The counter first-speed gear 36 and the counter second-speed gear 37 can be connected selectively to the counter shaft CS via a first synchromesh mechanism 46, the main third-speed gear 28 and the main fourth-speed gear 29 can be connected selectively to the main shaft MS via a second synchromesh mechanism 47, and the main fifth-speed gear 30 and the main sixth-speed gear 31 can be connected selectively to the main shaft MS via a third synchromesh mechanism 48.

A reverse first gear 49 and a reverse second gear 50 are relatively rotatably supported on the reverse counter shaft RCS via needle bearings 51 and 52, the reverse first gear 49 always meshing with the main reverse gear 27, the reverse second gear 50 always meshing with the counter reverse gear 44. The reverse first gear 49 and the reverse second gear 50 can be connected to each other via a fourth synchromesh mechanism 53.

A motor output gear 54 is relatively rotatably supported on the motor output shaft MOS via a needle bearing 55, the motor output gear 54 always meshing with the reverse second gear 50. The motor output gear 54 can be connected to the motor output shaft MOS via a fifth synchromesh mechanism 56.

The manual transmission T of this embodiment is operated automatically, and the clutch C and the first to the fifth synchromesh mechanisms 46, 47, 48, 53, and 56 are not operated manually by the driver but are operated automatically by an actuator.

A differential case 57 of the front differential gear Df is supported on the first casing 11 and the second casing 12 via ball bearings 58 and 59, and a final driven gear 60 provided on the differential case 57 meshes with the final drive gear 45 provided on the counter shaft CS. Two differential pinions 62 are rotatably supported on a pinion shaft 61 provided in the differential case 57, and these differential pinions 62 mesh with two differential side gears 63. Left and right axle shafts 64 are joined to the differential side gears 63, relatively rotatably supported on the differential case 57, and connected to the left and right front wheels Wf, respectively.

Figure 6:
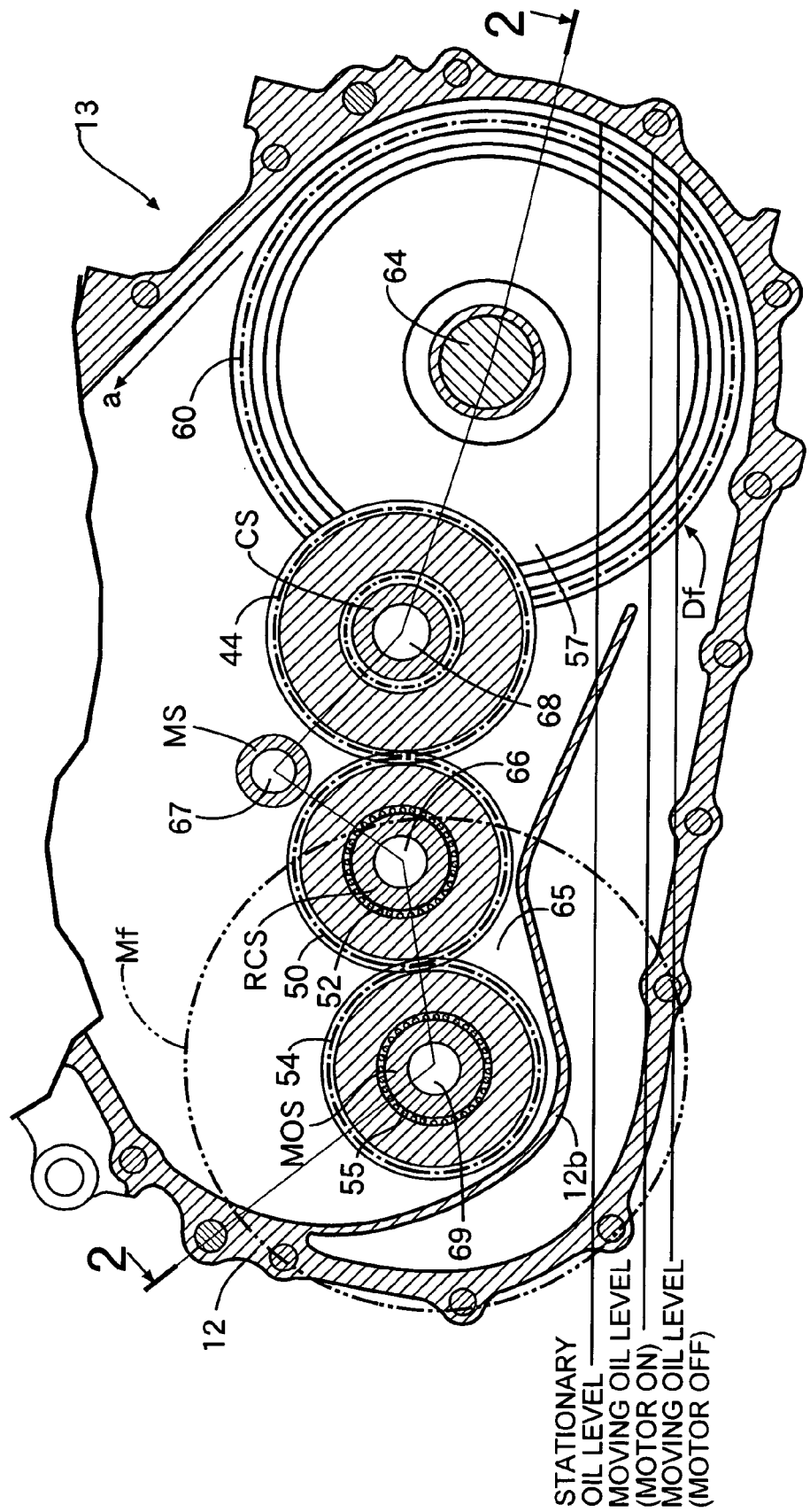

FIG. 6 is a sectional view in which the second casing 12 of the manual transmission T is sectioned in the vicinity of the mating face with the first casing 11; the reverse counter shaft RCS is disposed in front of and lower than the main shaft MS which is connected to the engine E, and the motor output shaft MOS is disposed in front of and lower than the reverse counter shaft RCS. The counter shaft CS is disposed behind and lower than the main shaft MS, and the front differential gear Df is disposed behind and lower than the counter shaft CS. An S-shaped partition wall 12b is provided in a lower part of the second casing 12, and extends from a front wall of the second casing 12 to beneath the counter shaft CS, and an oil reservoir 65 is formed in a front part of the partition wall 12b so as to surround the lower part of the motor output shaft MOS and the motor output gear 54.

Figure 2:
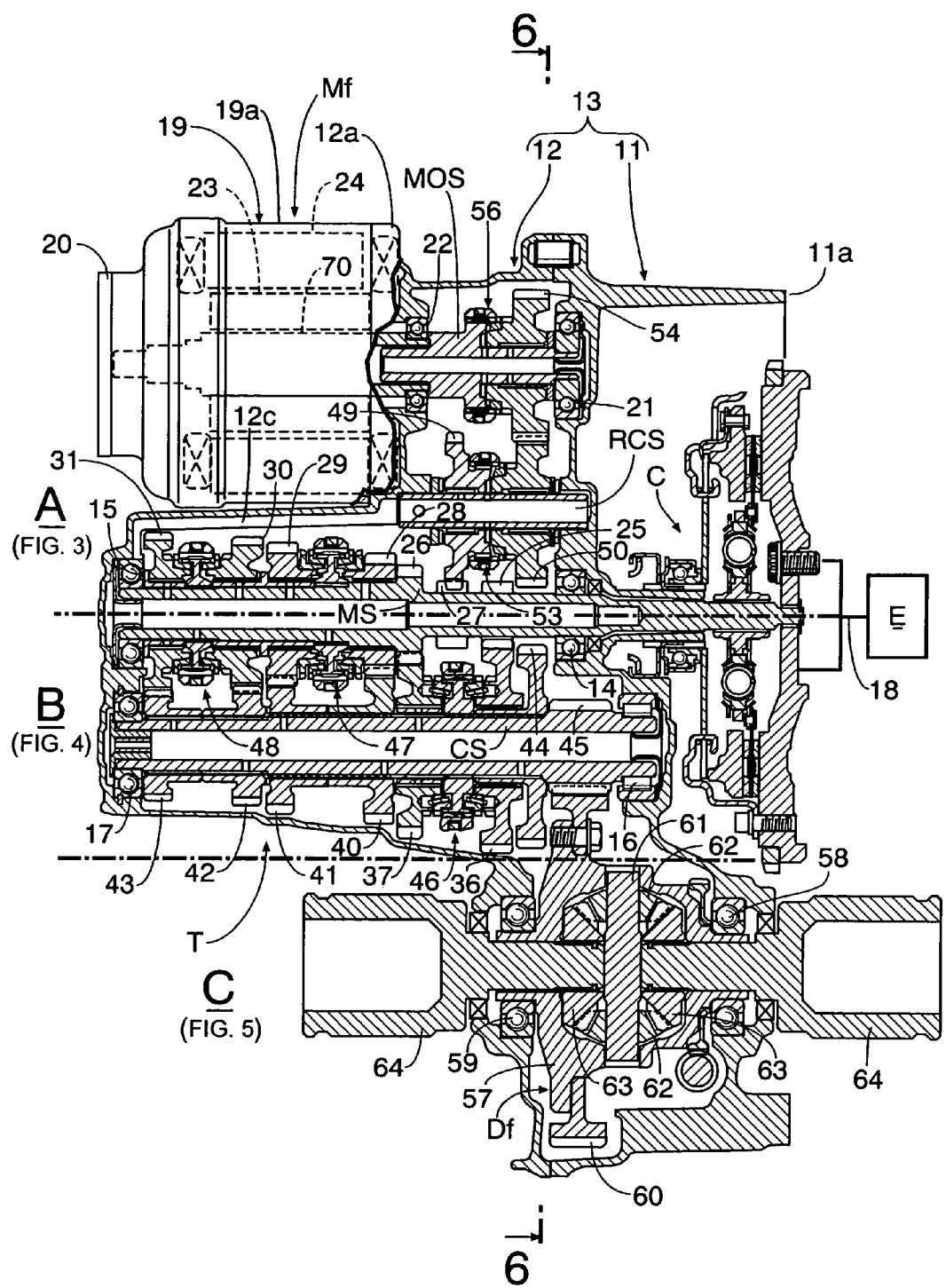
Figure 3:
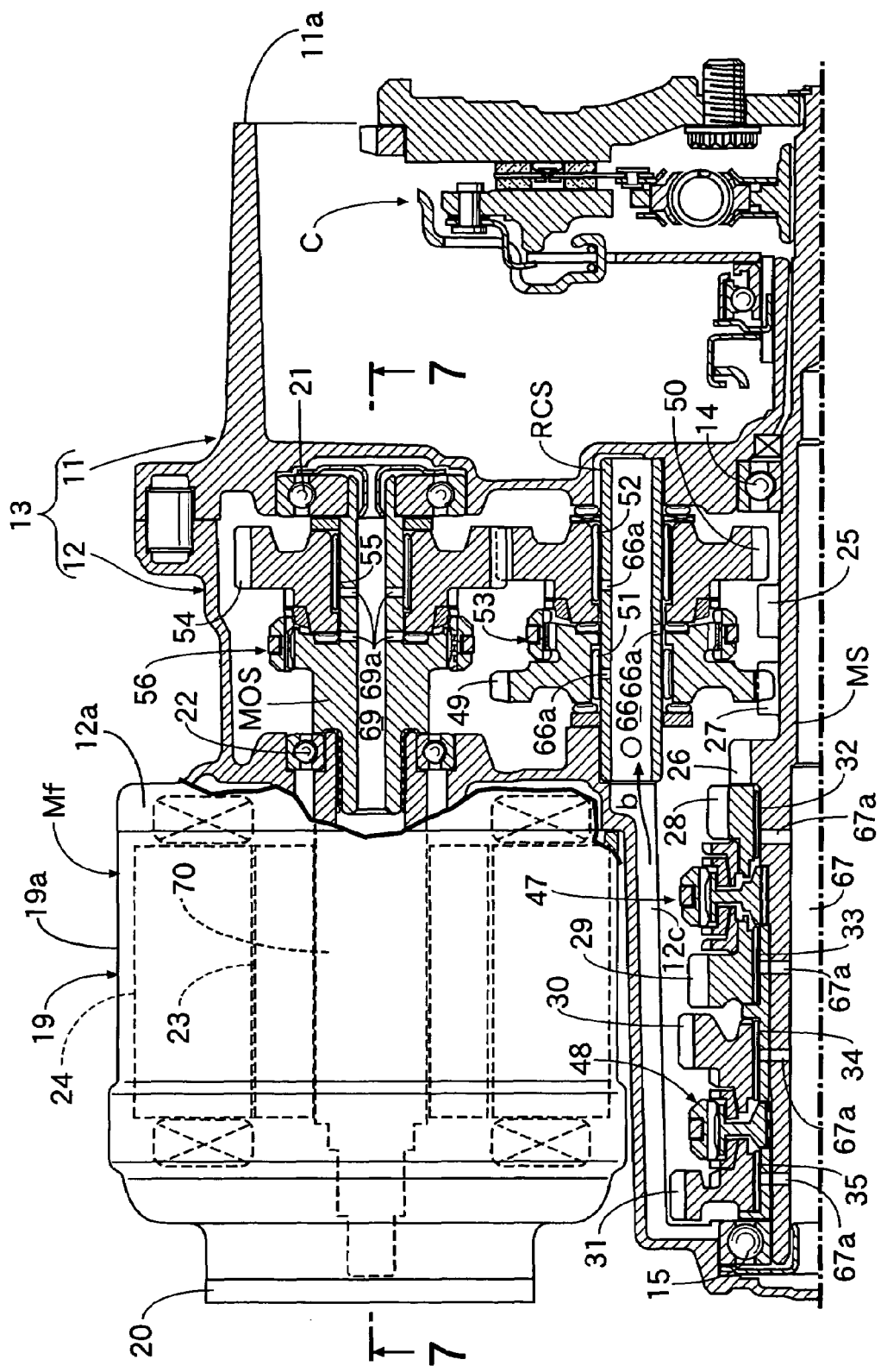
Figure 4:
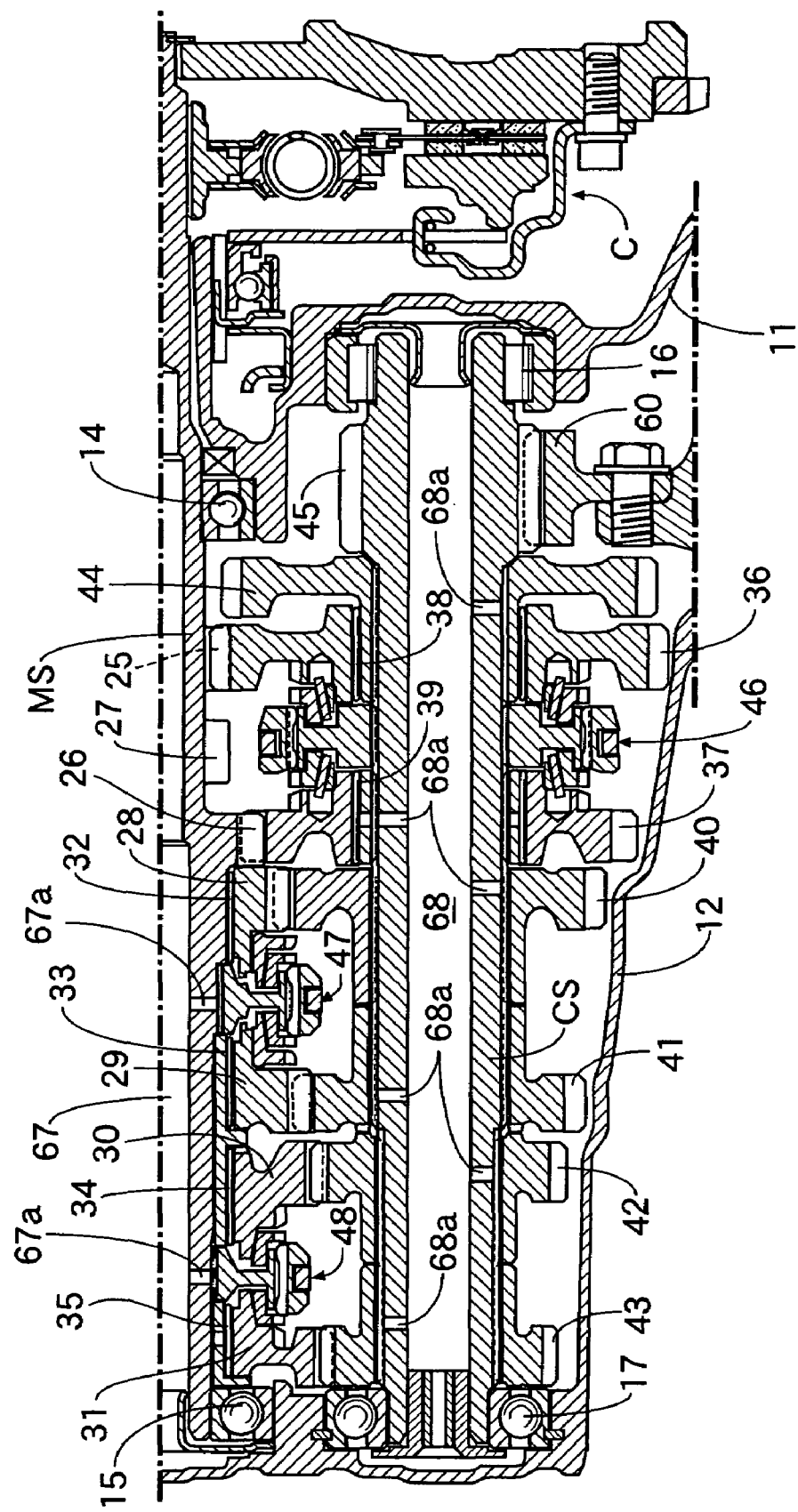
Figure 5:
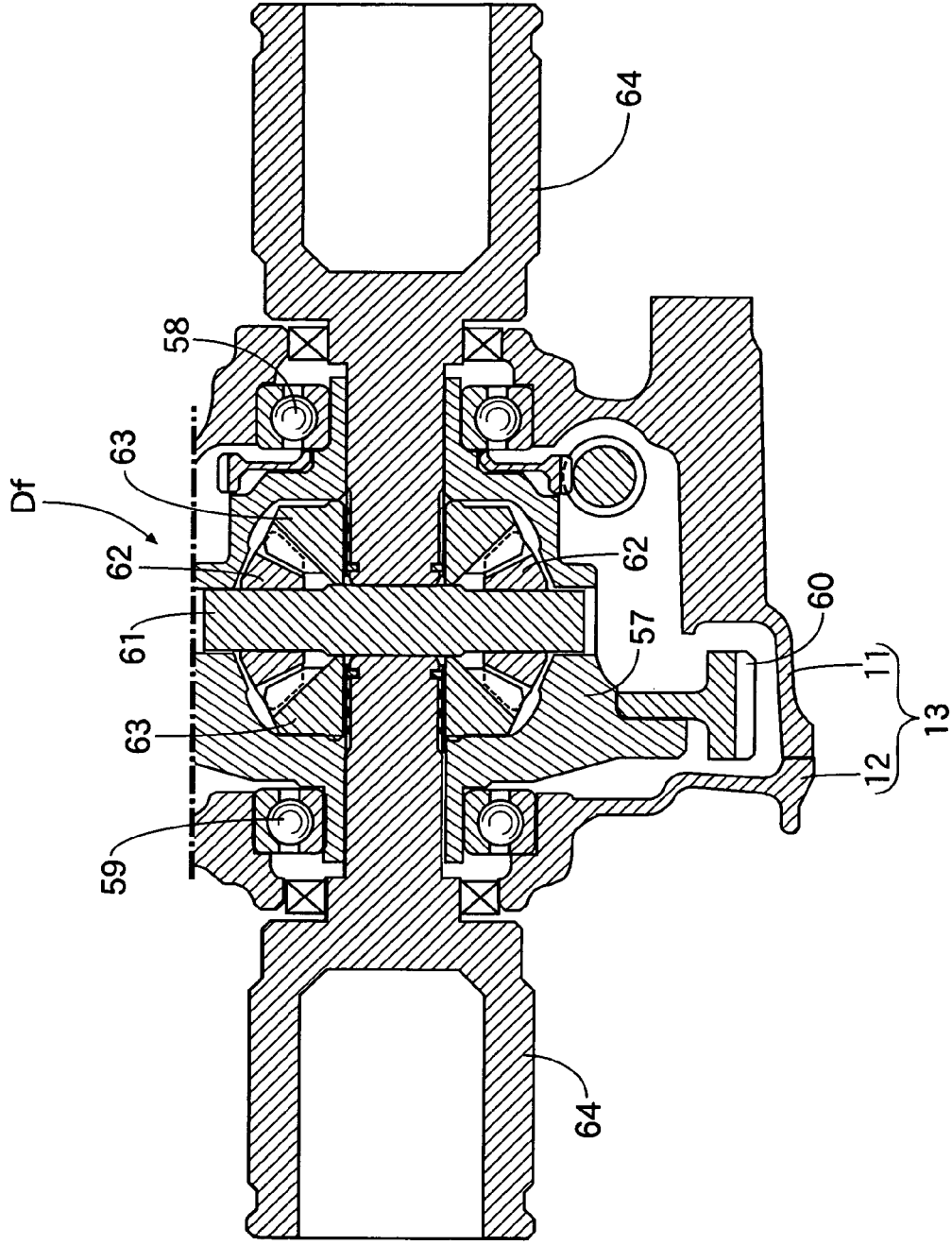

As is clear from FIG. 2 and FIG. 3, a laterally extending rib 12c is formed in a front face of the second casing 12 extending from the left end of the reverse counter shaft RCS to the left, and the right end of the rib 12c faces the left end of an oil passage 66 running through the interior of the reverse counter shaft RCS.

Figure 7:
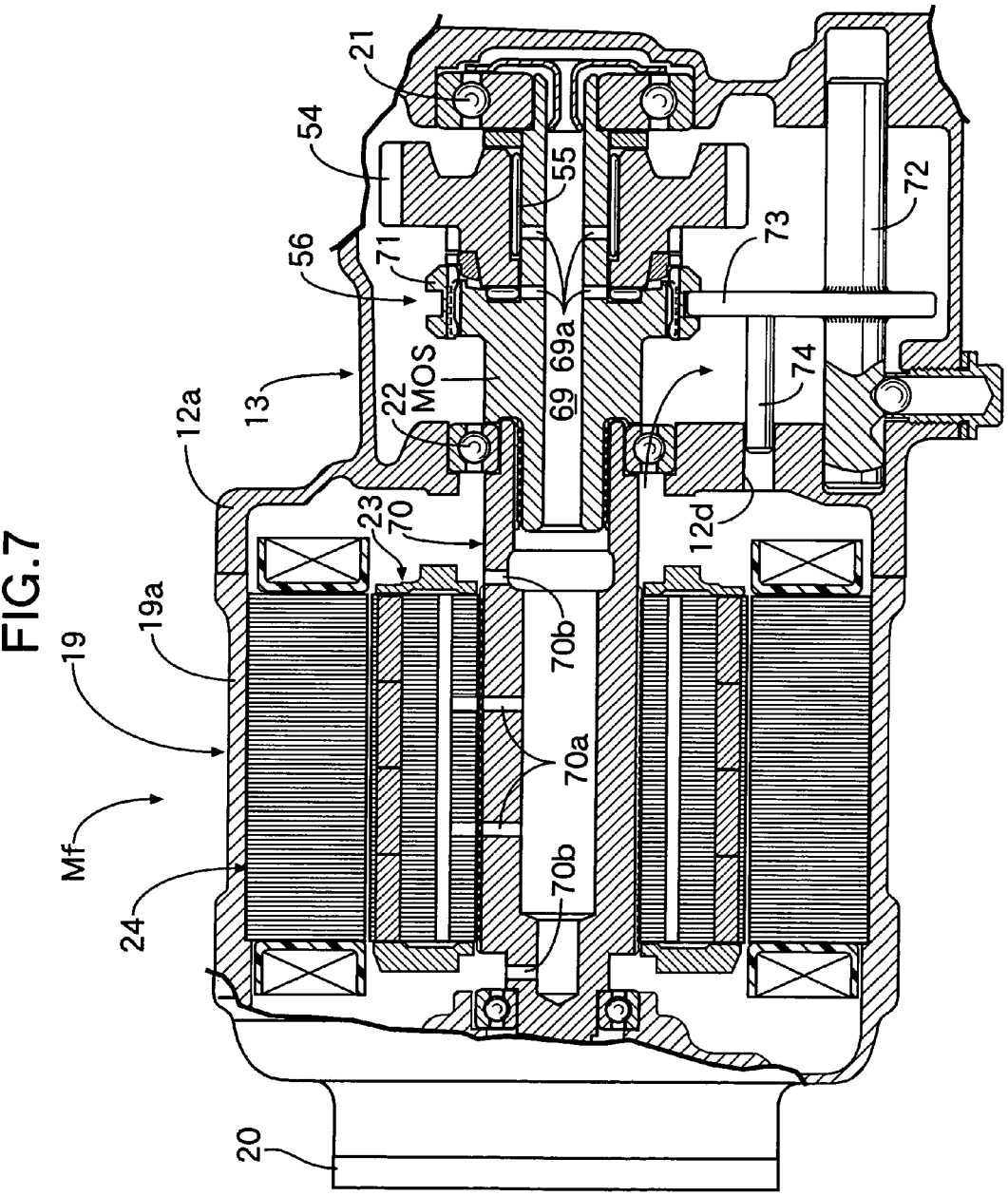

As is clear from FIG. 7, an oil return hole 12d is formed in a lower part of the front cover 12a which separates the motor case 19 from the transmission case 13. The fifth synchromesh mechanism 56 includes a sleeve 71, a shift rod 72, a shift fork 73, and an oil return hole blocking rod 74. The sleeve 71 is supported on the outer periphery of the motor output shaft MOS so that it can slide laterally and is capable of engaging with the motor output gear 54. The shift rod 72 is supported on the transmission case 13 so that it can slide laterally. The shift fork 73 is fixed to the shift rod 72 and drives the sleeve 71. The oil return hole blocking rod 74 is fixed to the shift fork 73 and is capable of fitting in the oil return hole 12d. When the shift fork 73 moves to the right and connects the motor output gear 54 to the motor output shaft MOS, the oil return hole blocking rod 74 opens the oil return hole 12d. When the shift fork 73 moves to the left and isolates the motor output gear 54 from the motor output shaft MOS, the oil return hole blocking rod 74 blocks the oil return hole 12d.

Referring to FIG. 10 to FIG. 13, a rear gear case 101, housing the reduction gear R and the rear differential gear Dr, is formed from a right-hand first casing 102 and a left-hand second casing 103, which are joined on a mating face extending in the longitudinal direction of the vehicle body. The rear motor Mr includes a motor case 104 formed from a main body casing 104a, a front cover 103a joined to a front face of the casing 104a, and a rear cover 105 joined to a rear face of the casing 104a, the front cover 103a being formed integrally with the second casing 103. The front cover 103a is therefore not part of the rear gear case 101 but forms a part of the motor case 104. The structure of the rear motor Mr is substantially the same as the structure of the front motor Mf; a motor output shaft MOS is supported on the first and second casings 102 and 103 via ball bearings 106 and 107, and a rotor 109 fixed to a motor shaft 108 of the rear motor Mr faces a stator 110 fixed to the inner periphery of the motor case 104.

A reduction shaft 113 is rotatably supported on the first and second casings 102 and 103 via a ball bearing 111 and a roller bearing 112. A motor output gear 115, supported on the outer periphery of the motor output shaft MOS via a needle bearing 114, meshes with a first reduction gear 116 fixed to the reduction shaft 113, and a second reduction gear 117 formed integrally with the reduction shaft 113 meshes with a final driven gear 118 of the rear differential gear Df. The first reduction gear 116, the reduction shaft 113, and the second reduction gear 117 form the reduction gear R.

A differential case 119 of the rear differential gear Dr is supported on the first and second casings 102 and 103 via ball bearings 120 and 121. Two differential pinions 123 are rotatably supported on a pinion shaft 122 provided in the differential case 119, and two differential side gears 124 mesh with these differential pinions 123. Left and right axle shafts 125 are joined to the differential side gears 124, relatively rotatably supported on the differential case 119, and connected to the left and right rear wheels Wr, respectively.

In the interior of the rear gear case 101 which has an oil reservoir 126 formed on the base thereof, the reduction shaft 113 is disposed behind and lower than the motor output shaft MOS of the rear motor Mr, and the rear differential gear Dr is disposed behind and lower than the reduction shaft 113.

An oil return hole 103d is formed in a lower part of the front cover 103a, which separates the motor case 104 from the rear gear case 101. A sixth synchromesh mechanism 128 includes a sleeve 130, a shift rod 131, a shift fork 132, and an oil return hole blocking rod 133. The sleeve 130 is supported, slidably in the lateral direction, on the outer periphery of the motor output shaft MOS and is capable of engaging with the motor output gear 115. The shift rod 131 is supported, slidably in the lateral direction, on the rear gear case 101. The shift fork 132 is fixed to the shift rod 131 and drives the sleeve 130. The oil return hole blocking rod 133 is fixed to the shift fork 132 and is capable of fitting in the oil return hole 103d. Further, when the shift fork 132 moves right and connects the motor output gear 115 to the motor output shaft MOS, the oil return hole blocking rod 133 opens the oil return hole 103d, and when the shift fork 132 moves left and isolates the motor output gear 115 from the motor output shaft MOS, the oil return hole blocking rod 133 blocks the oil return hole 103d.

The operation of the first embodiment of the present invention having the above-mentioned arrangement is now explained.

When the vehicle travels forward by means of the engine E, the fifth synchromesh mechanism 56 isolates the motor output gear 54 from the motor output shaft MOS so that the driving force will not be transmitted back to the front motor Mf, and the fourth synchromesh mechanism 53 disconnects the reverse first gear 49 from the reverse second gear 50.

When the counter first-speed gear 36 is connected to the counter shaft CS by the first synchromesh mechanism 46, a first-speed gear position is established, and rotation of the main shaft MS which is connected to the engine E via the clutch C is transmitted to the front wheels Wf via the main first-speed gear 25, the counter first-speed gear 36, the counter shaft CS, the final drive gear 45, the final driven gear 60, the front differential gear Df, and the axle shafts 64. When the counter second-speed gear 37 is connected to the counter shaft CS by the first synchromesh mechanism 46, a second-speed gear position is established, and rotation of the main shaft MS is transmitted from the main second-speed gear 26 to the counter second-speed gear 37, thus driving the front wheels Wf.

When the main third-speed gear 28 is connected to the main shaft MS by the second synchromesh mechanism 47, a third-speed gear position is established, and rotation of the main shaft MS is transmitted from the main third-speed gear 28 to the counter third-speed gear 40, thus driving the front wheels Wf. When the main fourth-speed gear 29 is connected to the main shaft MS by the second synchromesh mechanism 47, a fourth-speed gear position is established, and rotation of the main shaft MS is transmitted from the main fourth-speed gear 29 to the counter fourth-speed gear 41, thus driving the front wheels Wf. When the main fifth-speed gear 30 is connected to the main shaft MS by the third synchromesh mechanism 48, a fifth-speed gear position is established, and rotation of the main shaft MS is transmitted from the main fifth-speed gear 30 to the counter fifth-speed gear 42, thus driving the front wheels Wf. When the main sixth-speed gear 31 is connected to the main shaft MS by the third synchromesh mechanism 48, a sixth-speed gear position is established, and rotation of the main shaft MS is transmitted from the main sixth-speed gear 31 to the counter sixth-speed gear 43, thus driving the front wheels Wf.

Rotation of the counter shaft CS which is connected to the front wheels Wf is always transmitted to the motor output gear 54 via the counter reverse gear 44 and the reverse second gear 50, but when the motor output gear 54 is disconnected from the motor output shaft MOS by the fifth synchromesh mechanism 56, it is possible to prevent forcible rotation of the front motor Mf at high speed by an external force during high speed travel, which would result in deterioration of the durability, and prevent an increase in the fuel consumption of the engine E due to friction of the front motor Mf.

However, when the vehicle is decelerating and there is no possibility of the front motor Mf being excessively rotated by an external force, if the motor output gear 54 is connected to the motor output shaft MOS with the fifth synchromesh mechanism 56, the front motor Mf can function as a generator, thereby carrying out regenerative braking.

When the vehicle reverses by means of the engine E, the reverse first gear 49 and the reverse second gear 50 are integrally connected by the fourth synchromesh mechanism 53, to establish a reverse gear position. As a result, rotation of the main shaft MS which is connected to the engine E via the clutch C is transmitted to the front wheels Wf via the main reverse gear 27, the reverse first gear 49, the reverse second gear 50, the counter reverse gear 44, the counter shaft CS, the final drive gear 45, the final driven gear 60, the front differential gear Df, and the axle shafts 64.

During the above-mentioned forward travel or reverse travel by means of the engine E, if the front motor Mf is driven while the motor output gear 54 is connected to the motor output shaft MOS by the fifth synchromesh mechanism 56, the driving force of the front motor Mf is transmitted to the counter shaft CS via the motor output gear 54, the reverse second gear 50, and the counter reverse gear 44, thereby enabling the driving force of the front motor Mf to assist the driving force of the engine E. In this case, the direction in which the front motor Mf is driven changes according to whether the vehicle travels forward or backward.

When the vehicle is made to travel forward or backward by the driving force of the front motor Mf alone, without employing the driving force of the engine E, the front motor Mf is driven forward or backward while the motor output gear 54 is connected to the motor output shaft MOS by the fifth synchromesh mechanism 56, and the reverse first gear 49 is disconnected from the reverse second gear 50 by the fourth synchromesh mechanism 53. The driving force of the front motor Mf is thereby transmitted to the front wheels Wf via the motor output gear 54, the reverse second gear 50, the counter reverse gear 44, the counter shaft CS, the final drive gear 45, the final driven gear 60, the front differential gear Df, and the axle shafts 64.

When the driving force of the front motor Mf is transmitted to the front wheels Wf, rotation of the motor output gear 54 which is joined to the motor output shaft MOS is transmitted to the counter shaft CS via the second reverse gear 50. Therefore, the reduction ratio of a driving force transmission route from the front motor Mf to the counter shaft CS can be increased by utilizing the existing second reverse gear 50 and counter reverse gear 44. It is therefore unnecessary to provide a special reduction gear on the counter shaft CS, thus decreasing the number of components. Further, it is possible to prevent the length of the counter shaft CS from increasing, thus reducing the axial dimensions of the manual transmission T. Moreover, since the fourth synchromesh mechanism 53 for establishing the reverse gear position is provided on the reverse counter shaft RCS which is shorter than the counter shaft CS, the axial dimensions of the manual transmission T can be reduced in comparison with a case where the synchromesh mechanism is disposed on the counter shaft CS.

When the vehicle is made to travel forward or backward by the driving force of the rear motor Mr, as shown in FIGS. 10–13, the rear motor Mr is driven forward or backward while the motor output gear 115 is connected to the motor output shaft MOS by the sixth synchromesh mechanism 128. By so doing, the driving force of the rear motor Mr is transmitted to the rear wheels Wr via the motor output gear 115, the first reduction gear 116, the reduction shaft 113, the second reduction gear 117, the final driven gear 118, the rear differential gear Dr, and the axle shafts 125.

The operation of a lubrication system for the manual transmission T, the front differential gear Dr, the reduction gear R, and the rear differential gear Df is now explained.

Oil scraped up in the direction of arrow a in FIG. 6 by the final driven gear 60, situated at the lowest position in the interior of the transmission case 13, is collected in an oil supply section, which is not illustrated. The oil is supplied therefrom to oil passages 67 and 68 running axially through the interiors of the main shaft MS and the counter shaft CS, and ejected radially outward through oil holes 67a and 68a by virtue of centrifugal force to lubricate the gears, the needle bearings, the first to third synchromesh mechanisms 46 to 48, etc., which are disposed around the main shaft MS and the counter shaft CS.

A portion of the oil ejected through the oil holes 67a and 68a of the main shaft MS and the counter shaft CS flows downward along a wall of the second casing 12, and is guided by the rib 12c to flow into the oil passage 66 which runs axially through the interior of the reverse counter shaft RCS, as shown by arrow b in FIG. 3. Oil that has been ejected radially outward through oil holes 66a via the oil passage 66 lubricates the needle bearings 51 and 52, the reverse first gear 49, the reverse second gear 50, and the fourth synchromesh mechanism 53.

Oil that has been ejected through the oil holes 67a, 68a, and 66a of the main shaft MS, the counter shaft CS, and the reverse counter shaft RCS accumulates in the oil reservoir 65 on the partition wall 12b of the second casing 12. Oil scraped up therefrom by the motor output gear 54 is collected in an oil supply section, which is not illustrated, and oil supplied therefrom to an oil passage 69 running axially through the interior of the motor output shaft MOS is ejected radially outward through oil holes 69a by virtue of centrifugal force to lubricate the motor output gear 54, the needle bearings 55, and the fifth synchromesh mechanism 56, which are disposed around the motor output shaft MOS. A portion of the oil supplied to the oil passage 69 of the motor output shaft MOS is ejected by virtue of centrifugal force through oil holes 70a of the motor shaft 70, which is joined to the motor output shaft MOS; cools the rotor 23 and the stator 24; is ejected through oil holes 70b by virtue of centrifugal force; and accumulates in the interior of the motor case 19.

In this way, since the motor output shaft MOS is disposed below the main shaft MS and the reverse counter shaft RCS, it is possible to lubricate the surroundings of the motor output shaft MOS with the oil that has lubricated the surroundings of the main shaft MS and the reverse counter shaft RCS, thereby simplifying the structure of the lubrication system.

When the vehicle travels by means of the driving force of the engine E, as shown in FIG. 7, if the sleeve 71 is moved to the left with the shift fork 73 so as to isolate the motor output gear 54 from the motor output shaft MOS, it is possible to prevent an external force from being transmitted to the front motor Mf, thus eliminating the resistance caused by dragging the front motor Mf to reduce the fuel consumption of the engine E. Furthermore, if the motor output gear 54 is isolated from the motor output shaft MOS, the front motor Mf is prevented from being excessively rotated by an external force, thereby ensuring the durability of the front motor Mf.

In this process, the oil return hole blocking rod 74 provided on the shift fork 73 blocks the oil return hole 12d of the front cover 12a, and thus the oil level within the motor case 19 rises to the bottom of the ball bearing 22, and surplus oil within the motor case 19 is returned to the interior of the transmission case 13 via the ball bearing 22. In this way, increasing the amount of oil accumulating within the motor case 19 when the front motor Mf is stopped allows the oil level within the transmission case 13 to descend to the "MOVING OIL LEVEL (MOTOR OFF)" position in FIG. 6, thus reducing the oil stirring resistance of a gear, etc. rotating within the transmission case 13 to reduce the fuel consumption of the engine E.

Figure 8:
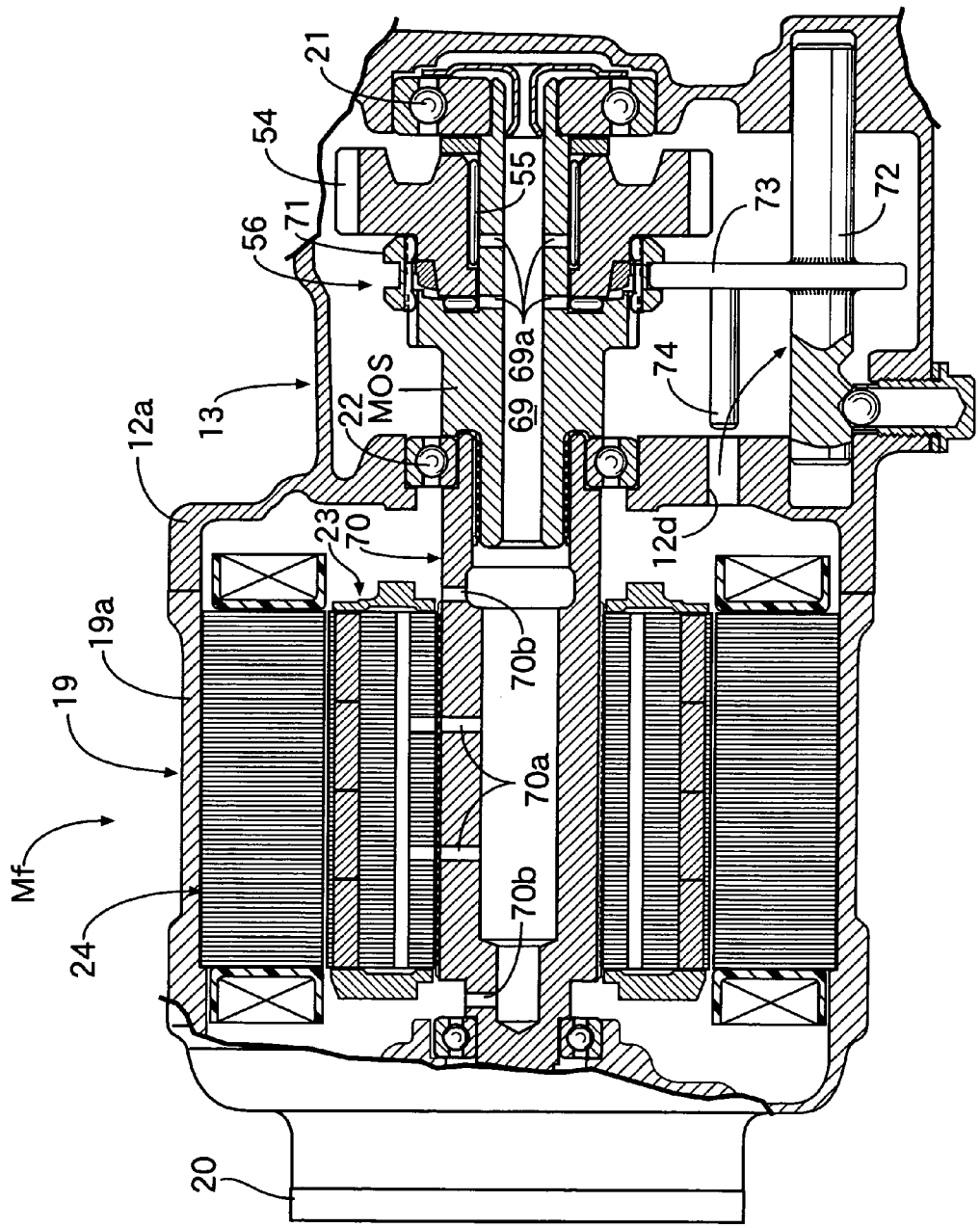
Figure 9:
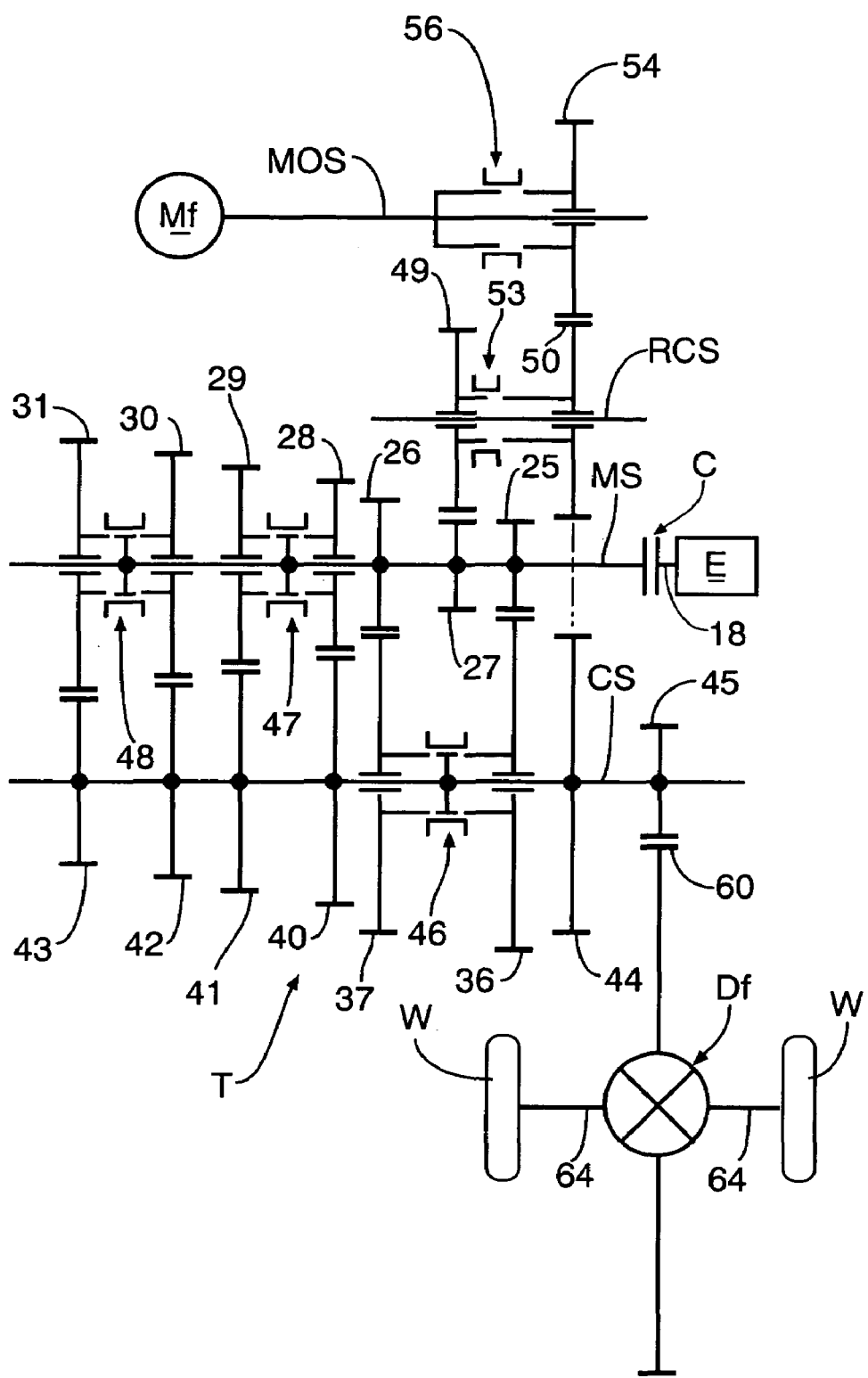

When the vehicle travels by means of the driving force of the front motor Mf or the driving forces of the front motor Mf and the engine E, as shown in FIG. 8, if the sleeve 71 is moved to the right with the shift fork 73 so as to connect the motor output gear 54 to the motor output shaft MOS, the driving force of the front motor Mf can be transmitted to the manual transmission T. In this process, the oil return hole blocking rod 74 provided on the shift fork 73 opens the oil return hole 12d of the front cover 12a, and thus the oil level within the motor case 19 descends to the position of the oil return hole 12d, so that the oil stirring resistance of the rotor 23 of the front motor Mf decreases. Accompanying the drop of the oil level within the motor case 19, the oil level within the transmission case 13 rises to the "MOVING OIL LEVEL (MOTOR ON)" position in FIG. 6.

Figure 12:
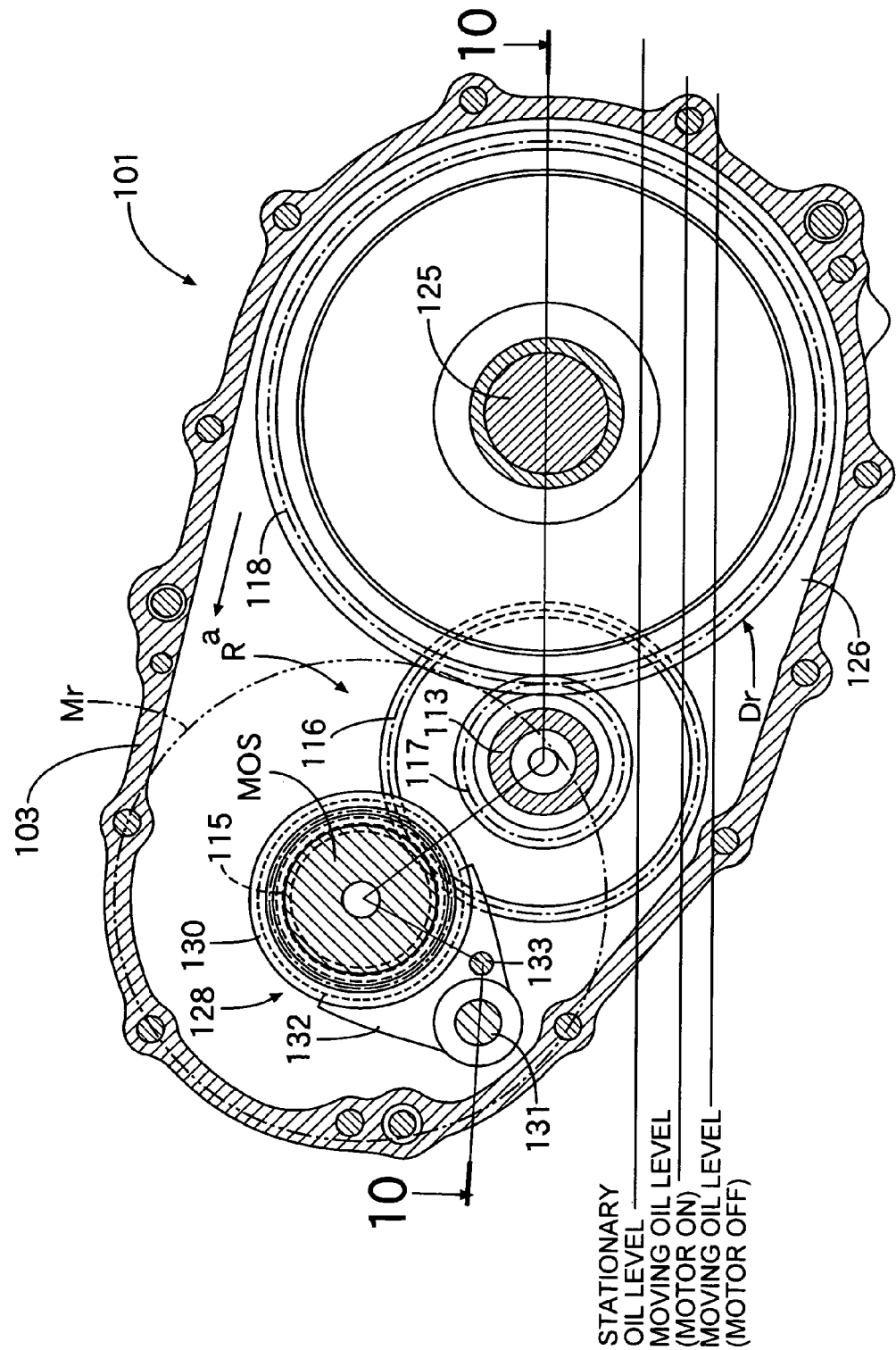
Figure 13:
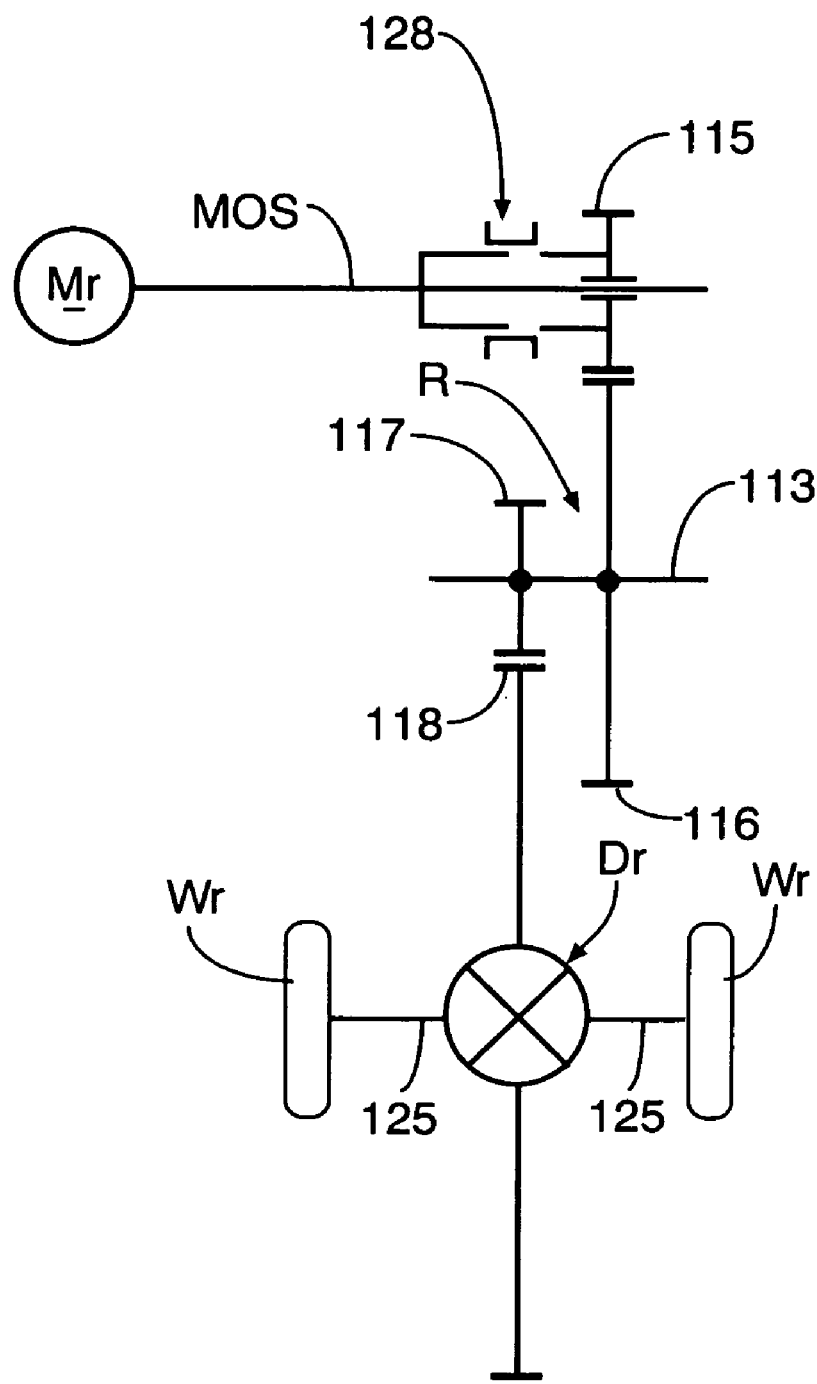

Oil scraped up in the direction of arrow a in FIG. 12 by the final driven gear 118 situated in the lowest position within the rear gear case 101, lubricates the first reduction gear 116 and the second reduction gear 117. Oil that has flowed into an oil passage 127 running axially through the interior of the motor output shaft MOS is ejected radially outward through oil holes 127a by virtue of centrifugal force, to lubricate the motor output gear 115, the needle bearing 114, and the sixth synchromesh mechanism 128, which are disposed around the motor output shaft MOS. A portion of the oil supplied to the oil passage 127 of the motor output shaft MOS is ejected, by virtue of centrifugal force, through oil holes 108a of the motor shaft 108 which is joined to the motor output shaft MOS; cools the rotor 109 and the stator 110; is ejected through the oil holes 108b by virtue of centrifugal force; and accumulates within the motor case 104.

Figure 10:
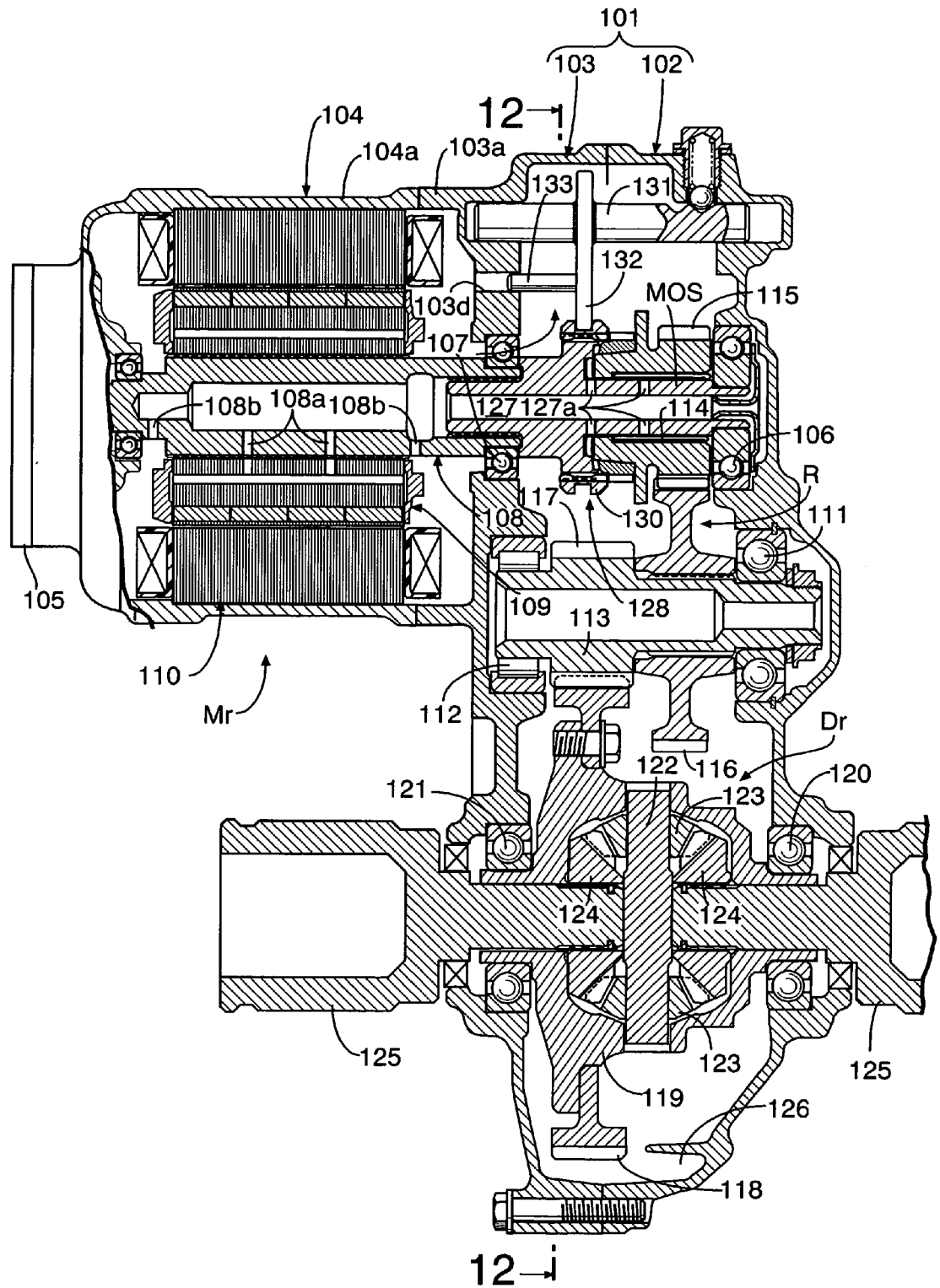

When the vehicle travels by means of the driving force of the engine E, as shown in FIG. 10, if the sleeve 130 is moved to the left with the shift fork 132 so as to isolate the motor output gear 115 from the motor output shaft MOS, it is possible to prevent an external force from being transmitted to the rear motor Mr, thus eliminating the resistance caused by dragging the rear motor Mr to reduce the fuel consumption of the engine E. Moreover, since the motor output gear 115 is isolated from the motor output shaft MOS, the rear motor Mr is prevented from being excessively rotated by an external force, thereby ensuring the durability of the rear motor Mr.

In this process, the oil return hole blocking rod 133 provided on the shift fork 132 blocks the oil return hole 103d of the front cover 103a, and thus the oil level within the motor case 104 rises to the bottom of the ball bearing 107, so that surplus oil within the motor case 104 is returned to the interior of the rear gear case 101 via the ball bearing 107. In this way, increasing the amount of oil accumulating in the motor case 104 when the rear motor Mr is stopped allows the oil level within the rear gear case 101 to descend to the "MOVING OIL LEVEL (MOTOR OFF)" position in FIG. 12, thus reducing the stirring resistance of a gear, etc. rotating within the rear gear case 101 to reduce the fuel consumption of the engine E.

Figure 11:
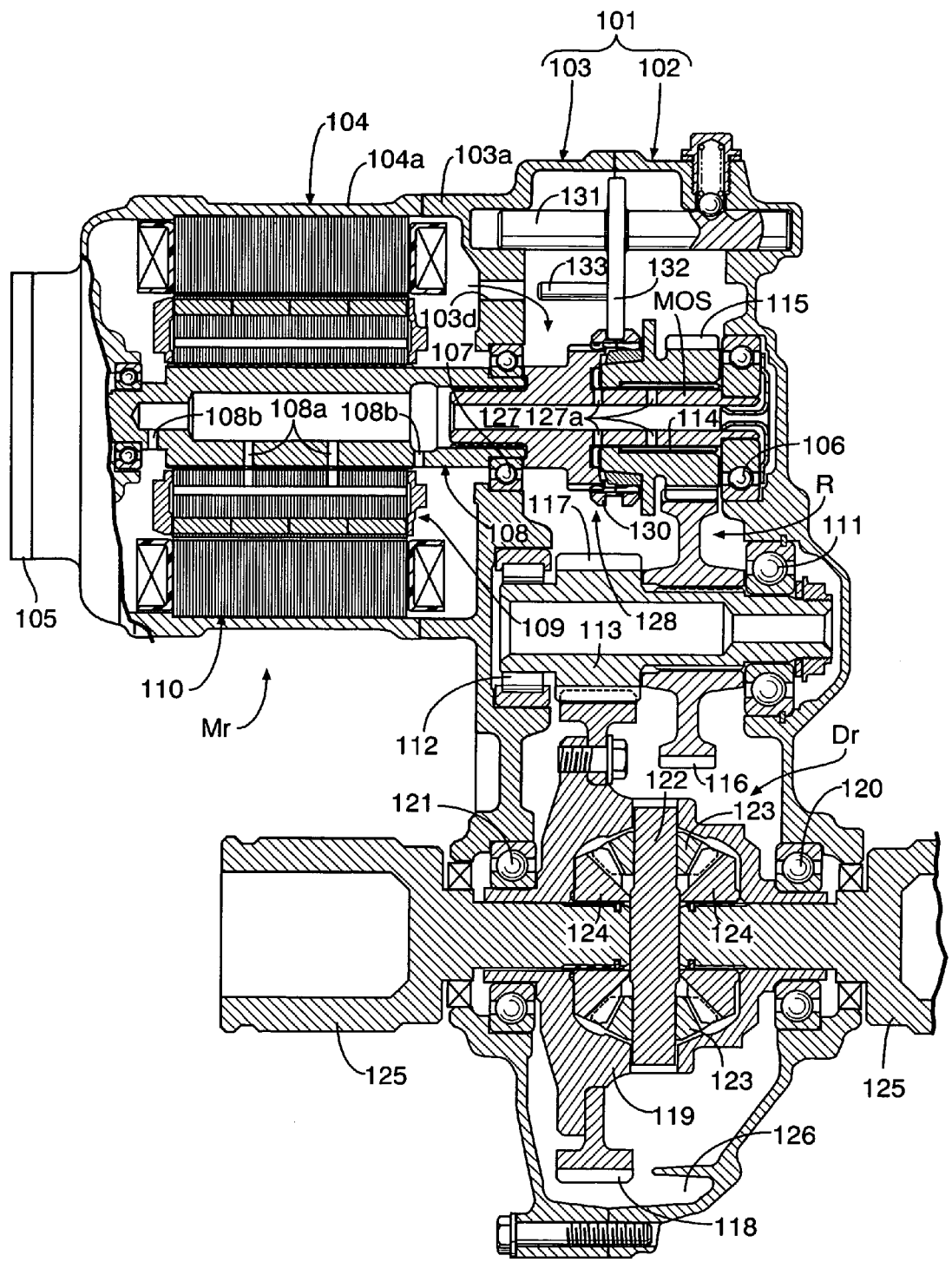

When the rear motor Mr is driven or undergoes regenerative braking, as shown in FIG. 11, if the sleeve 130 is moved to the right with the shift fork 132 so as to connect the motor output gear 115 to the motor output shaft MOS, the driving force can be transmitted between the rear motor Mr and the rear wheels Wr. In this process, the oil return hole blocking rod 133 provided on the shift fork 132 opens the oil return hole 103d of the front cover 103a, and thus the oil level within the motor case 104 descends to the position of the oil return hole 103d, so that the oil stirring resistance of the rotor 109 of the rear motor Mr decreases. Accompanying the drop in oil level within the motor case 104, the oil level within the rear gear case 101 rises to the "MOVING OIL LEVEL (MOTOR ON)" position in FIG. 12.

Figure 14:
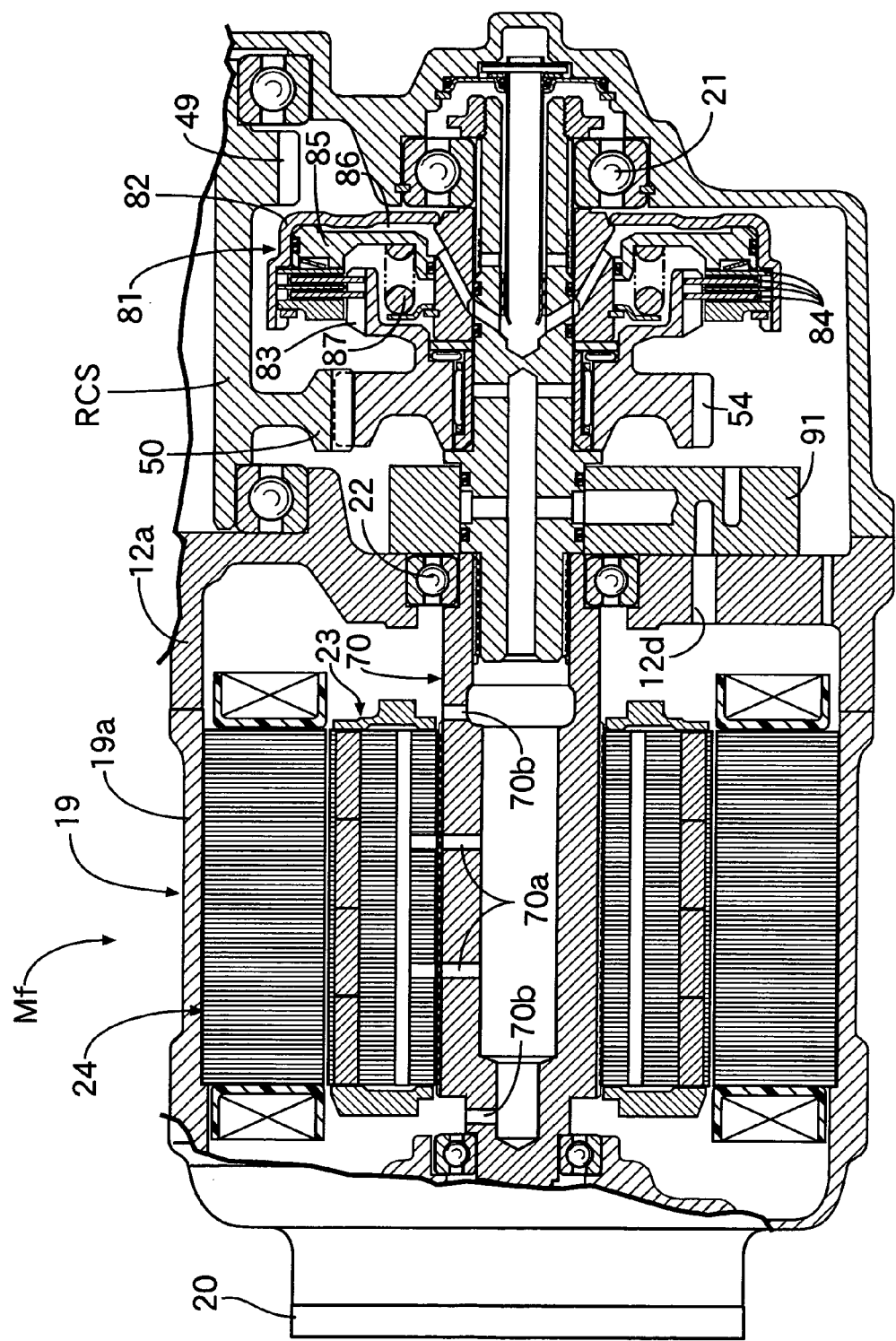
FIG. 14 is a diagram, corresponding to FIG. 7, of a second embodiment of the present invention.

A second embodiment of the present invention is now explained with reference to FIG. 14 and FIG. 15.

In the first embodiment, the oil return hole 12d of the motor case 19 is opened and closed in mechanical association with the movement of the shift fork 73 of the fifth synchromesh mechanism 56 which is capable of isolating the front motor Mf from the manual transmission T, but in the second embodiment an oil return hole 12*d* is opened and closed by a valve that is operated by hydraulic pressure.

That is, in the first embodiment, the motor output first gear 54 engages with the motor output shaft MOS via the fifth synchromesh mechanism 56, but in the second embodiment a motor output first gear 54 engages with a motor output shaft MOS via a hydraulic clutch 81. The hydraulic clutch 81 includes a clutch outer 82, a clutch inner 83, a plurality of frictional engagement elements 84, a clutch piston 85, an oil chamber 86, and a return spring 87. The clutch outer 82 is fixed to the motor output shaft MOS, while the clutch inner 83 is fixed to the motor output first gear 54. The plurality of frictional engagement elements 84 are supported by the clutch outer 82 and the clutch inner 83, and the clutch piston 85 is slidably supported in the interior of the clutch outer 82. The oil chamber 86 is formed between the clutch outer 82 and the clutch piston 85, and the return spring 87 urging the clutch piston 85 in a direction in which the volume of the oil chamber 86 is decreased.

A clutch control valve 89, which is a solenoid valve, is disposed between an oil pump 88 and the oil chamber 86 of the hydraulic clutch 81, and an oil discharge valve 90 is disposed between the oil chamber 86 and an oil return hole 12*d* of a motor case 19. The oil discharge valve 90 is provided in a valve housing 91 fixed to the motor case 19.

When a spool 93 is moved to the left by a solenoid 92 of the clutch control valve 89, a port P1 communicates with a port P2, oil is supplied from the oil pump 88 to the oil chamber 86 of the hydraulic clutch 81, the clutch piston 85 makes the frictional engagement elements 84 engage, and the motor output gear 54 is connected to the motor output shaft MOS. At the same time, the hydraulic pressure, which has engaged the hydraulic clutch 81, acts on a port P3 of the oil discharge valve 90 so as to move the spool 94 to the left, thus providing communication between a port P4 and a port P5, the port P4 communicating with the oil return hole 12*d* of the motor case 19, the port P5 communicating with the interior of the transmission case 13. As a result, oil that has accumulated in the motor case 19 is discharged through the oil return hole 12*d* to the interior of the transmission case 13 via the ports P4 and P5 of the oil discharge valve 90.

Conversely, when the spool 93 is moved to the right by the solenoid 92 of the clutch control valve 89, communication between the port P1 and the port P2 is cut off, and oil from the oil pump 88 is not supplied to the oil chamber 86 of the hydraulic clutch 81, the hydraulic clutch 81 is disengaged, and the front motor Mf is isolated from a manual transmission T. At the same time, the spool 94 of the oil discharge valve 90 moves to the right by virtue of the resilient force of a spring 95, communication is cut off between the port P4 which communicates with the oil return hole 12*d* and the port P5 which communicates with the interior of the transmission case 13, and the oil return hole 12*d* is therefore blocked, so that oil accumulates in the motor case 19.

Also, in accordance with this second embodiment, when the engine E runs at high speed, disengaging the hydraulic clutch 81 so as to decrease the resistance caused by dragging the front, motor Mf reduces the fuel consumption; and moreover the oil discharge valve 90 blocks the oil return hole 12*d* in association with disengagement of the hydraulic clutch 81, oil accumulates within the motor case 19, the oil level within the transmission case 13 descends, and the oil stirring resistance within the transmission case 13 is reduced, thereby further reducing the fuel consumption.

Although embodiments of the present invention has been described in detail above, the present invention is not limited to the above-mentioned embodiments and can be modified in a variety of ways without departing from the subject matter of the present invention.

For example, the manual transmission T of the embodiments is operated automatically by the actuator, but it may be operated manually by the driver.

Furthermore, in the present embodiments, the illustrated manual transmission T is of a parallel shaft type, but the present invention is applicable to an automatic transmission of a parallel shaft type in which gear shifting is carried out using a plurality of clutch mechanisms.

Moreover, the fifth and sixth synchromesh mechanisms 56 and 128 of the present invention may be dog clutches having no synchromesh function.

Furthermore, the structure described in the second embodiment in which the oil return hole 12*d* is opened and closed by the valve operated by hydraulic pressure may be applied without modification to the rear motor Mr.

The invention claimed is:

1. A vehicular drive system, comprising:
   a motor;
   a power transmission mechanism;
   motor isolation means via which the motor and the power transmission mechanism are connected, the driving force of the motor being transmitted to driven wheels via the power transmission mechanism, the power transmission mechanism and the motor being lubricated with a common oil; and
   oil retaining means for retaining, within a motor case, a portion of the oil from a power transmission mechanism case only when the motor isolation means isolates the motor from the power transmission mechanism.

2. The vehicular drive system according to claim 1, wherein the motor isolation means is a dog clutch, and the oil retaining means operates in mechanical association with engagement and disengagement of the dog clutch.

3. The vehicular drive system according to claim 1, wherein
   the motor isolation means is a hydraulic clutch, and
   the oil retaining means is operated by hydraulic pressure for engaging and disengaging the hydraulic clutch.

4. The vehicular drive system according to any one of claims 1 to 3, wherein
   the vehicular drive system further comprises an engine for driving the driven wheels via the power transmission mechanism, and
   the power transmission mechanism comprises a transmission for varying the driving forces of the motor and the engine.

5. The vehicular drive system according to any one of claims 1 to 3, wherein
   the power transmission mechanism comprises a differential gear for distributing the driving force of the motor between the left and right driven wheels.

6. A vehicle drive system, comprising:
   a power transmission mechanism for providing power to drive a pair of driven wheels of the vehicle;
   an engine for supplying power to said power transmission mechanism;
   a motor, having a motor case, and operatively coupled to said power transmission mechanism for supplying power thereto;

a motor isolator interposed between said motor and said power transmission mechanism for isolating said motor from said power transmission mechanism, wherein said motor and said power transmission mechanism are lubricated with a common oil; and an oil retaining means for retaining, within said motor case, a portion of the common oil from said power transmission mechanism, only when said motor isolator isolates said motor from said power transmission mechanism.

7. The vehicle drive system according to claim 6, wherein said motor isolator is a dog clutch, and said oil retaining means is operatively connected to and functions in accordance with engagement and disengagement of said dog clutch.

8. The vehicle drive system according to claim 6, wherein said motor isolator is an hydraulic clutch, and said oil retaining means is operated by hydraulic pressure for engaging and disengaging the hydraulic clutch.

9. The vehicle drive system of claims 7 or 8, further comprising:

an auxiliary power transmission mechanism for providing power to drive an auxiliary pair of wheels, separate from said pair of driven wheels;

an auxiliary motor, having an auxiliary motor case, operatively coupled to said auxiliary power transmission mechanism for supplying power thereto;

an auxiliary motor isolator interposed between said auxiliary motor and said auxiliary power transmission mechanism, wherein said auxiliary motor and said auxiliary power transmission mechanism are lubricated with a common oil; and an auxiliary oil retaining means for retaining, within said auxiliary motor case, a portion of the common oil from said auxiliary power transmission mechanism, when said auxiliary motor isolator isolates said auxiliary motor from said auxiliary transmission mechanism.

10. The vehicle drive system according to claim 9, wherein the power transmission mechanism comprises a transmission for varying the driving forces of the motor and the engine.

11. The vehicle drive system according to claim 9, wherein said power transmission mechanism comprises a differential gear for distributing driving force of the motor between the left and right driven wheels.

12. The vehicle drive system according to claim 9, wherein said auxiliary power transmission mechanism comprises a differential gear for distributing driving force of the auxiliary motor to said auxiliary pair of wheels.

13. A vehicle drive system, comprising:

a power transmission mechanism for providing power to drive a pair of driven wheels of the vehicle;

a motor, having a motor case, and operatively coupled to said power transmission mechanism for supplying power thereto;

a motor isolator interposed between said motor and said power transmission mechanism for isolating said motor from said power transmission mechanism, wherein said motor and said power transmission mechanism are lubricated with a common oil; and an oil retaining means for retaining, within said motor case, a portion of the common oil from said power transmission mechanism, only when said motor isolator isolates said motor from said power transmission mechanism.

14. The vehicular drive system according to claim 1, wherein said motor is disposed in said motor case, and said power transmission mechanism is disposed in said power transmission mechanism case, such that said motor case and power transmission mechanism case are separated from one another by a partition wall, the partition wall having an oil return hole therein, and wherein said oil retaining means closes said oil return hole, when said motor isolation means isolates the motor from the power transmission mechanism.

15. The vehicle drive system according to claim 6, wherein said motor is disposed in said motor case, and said power transmission mechanism is disposed in a power transmission mechanism case, such that said motor case and power transmission mechanism case are separated from one another by a partition wall, the partition wall having an oil return hole therein, and wherein said oil retaining means closes said oil return hole, when said motor isolator isolates the motor from the power transmission mechanism.

16. The vehicle drive system according to claim 13, wherein said motor is disposed in said motor case, and said power transmission mechanism is disposed in a power transmission mechanism case, such that said motor case and power transmission mechanism case are separated from one another by a partition wall, the partition wall having an oil return hole therein, and wherein said oil retaining means closes said oil return hole, when said motor isolator isolates the motor from the power transmission mechanism.

* * * * *